April 17, 1962 W. H. VON AULOCK 3,030,593
TEMPERATURE COMPENSATED GYROMAGNETIC DEVICE
Filed May 27, 1959 2 Sheets-Sheet 1
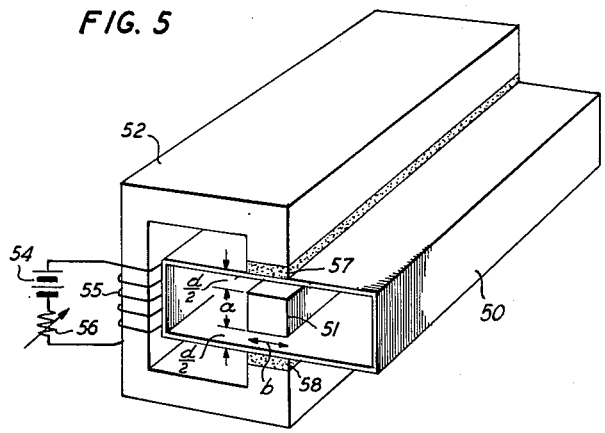
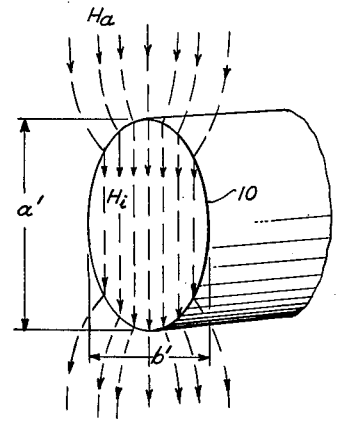
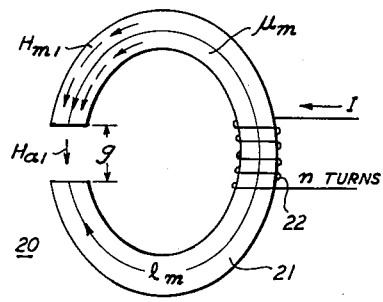
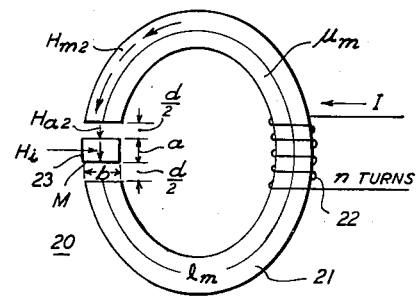
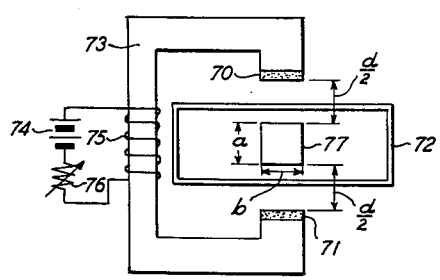
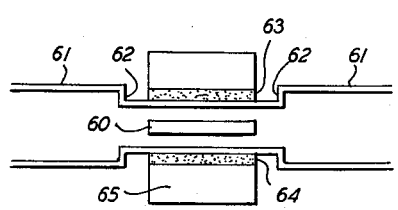
INVENTOR
W. H. VON AULOCK
BY
Roy M. Porter Jr.
ATTORNEY April 17, 1962  W. H. VON AULOCK  3,030,593
TEMPERATURE COMPENSATED GYROMAGNETIC DEVICE
Filed May 27, 1959  2 Sheets-Sheet 2

INVENTOR
W. H. VON AULOCK
BY
Roy M. Parter Jr.
ATTORNEY

United States Patent Office 3,030,593
Patented Apr. 17, 1962

3,030,593
TEMPERATURE COMPENSATED GYRO-
MAGNETIC DEVICE
Wilhelm H. von Aulock, West Orange, N.J., assignor to
Bell Telephone Laboratories, Incorporated, New York,
N.Y., a corporation of New York
Filed May 27, 1959, Ser. No. 816,099
6 Claims. (Cl. 333—24)

This invention relates to electromagnetic wave transmission systems and, more particularly, to methods and means for rendering the electrical characteristics of components employing gyromagnetic material within such systems insensitive to temperature variations.

In the past, a major part of the scientific endeavor in the field of microwave applications of gyromagnetic materials has been directed toward the realization of new and varied means of utilizing these materials to affect the electrical characteristics of high frequency wave energy. Such well-known devices as gyromagnetic resonance attenuators, nonreciprocal phase shifters, field displacement devices, Faraday rotation devices, and electrically tunable resonant cavities have emerged as a result of this effort. As a general class of components, however, these gyromagnetic devices are characterized by electrical performances which are in part dependent on their temperature. This temperature dependence occurs since the behavior of gyromagnetic materials in the microwave region is controlled by its tensor permeability which is itself a function of a temperature dependent parameter, the saturation magnetization of the material.

It is, therefore, an object of this invention to render gyromagnetic devices temperature insensitive over a considerable temperature range.

It has been suggested priorly that the undesirable effects of temperature dependence may be eliminated by maintaining the temperature of the atmosphere surrounding the gyromagnetic device at a constant level or by utilizing the feedback principle to vary the strength of the applied magnetic field in response to temperature variations. Either of these methods requires additional equipment which involves both maintenance and the provision of an added power supply. A further prior art method of temperature compensation involves the utilization of a temperature-dependent magnetic shunt in the field of the external magnet to vary the strength of the applied field.

It is a further object of the present invention to temperature compensate gyromagnetic devices without adding additional system components.

In accordance with the invention, the transverse cross sectional dimensions of the gyromagnetic medium and the total width of the air gap between gyromagnetic material and magnet pole pieces are determined such that the resulting demagnetizing factors associated with the geometry effectively cancel out the temperature dependence of the saturation magnetization of the material. Over a considerable temperature range the behavior of gyromagnetic material is governed by its tensor permeability components, $\mu$ and $\kappa$, which are themselves related to the saturation magnetization $M_s$ and the internal field $H_i$ associated with the material as follows:

$$\mu = 1 - \frac{p\sigma}{1-\sigma^2} \quad (1a)$$

$$\kappa = \frac{p}{1-\sigma^2} \quad (1b)$$

where $\sigma = \frac{\gamma H_i}{\omega}$, the normalized internal field, $p = \frac{\gamma M_s}{\omega}$, the normalized saturation magnetization, $\gamma = 2.8$ oersted/mc., the gyromagnetic ratio, and
$\omega$ is the operating frequency.

It will thus be necessary to investigate the variation of $M_s$ and $H_i$ with temperature in order to determine the temperature compensating geometry. Generally, $M_s$ decreases with, and is a linear function of, temperature over a considerable temperature range. The internal field $H_i$ in gyromagnetic material subjected to an applied external field $H_a$ is generally different in magnitude from the applied field due to internal demagnetizing fields set up by and within the material. Thus, $$H_i = H_a - F_d M_s \quad (2)$$

where $F_d$ is a demagnetizing factor.

The demagnetizing factor is a function of the physical geometry of the magnet-element structure and depends primarily upon the spacing of the magnet pole pieces and the cross sectional dimensions of the gyromagnetic element.

From Equations (1a, b) and (2) it is apparent that temperature variations of the saturation magnetization enter into the microwave properties of gyromagnetic materials in two ways:

(1) The components of the tensor permeability are proportional to the normalized saturation magnetization $p$, which is temperature dependent.
(2) When the internal field $H_i$ is different from the applied field $H_a$ (demagnetizing factor is non-zero), the normalized internal field $\sigma$ is also a function of temperature.

Furthermore it follows from Equation (2) that the temperature dependence of the internal field may be controlled by suitable choice of the demagnetizing factor. Given this degree of control, the possibility of compensation of the temperature dependence of the tensor permeability and thus of the behavior of the gyromagnetic material becomes less remote.

In accordance with the method of the present invention, the operation of the gyromagnetic device is related mathematically to the intrinsic properties of the gyromagnetic material, expressed as the tensor components $\mu$ and $\kappa$ through a "device function," $F(\mu,\kappa)$, which may define phase shift, resonance condition, Faraday rotation, or any other gyromagnetic phenomenon of interest, depending on the specific application of the device under consideration. Using Equations (1) and (2), the device function may be expressed in terms of the normalized internal field $\sigma$ and normalized saturation magnetization $p$. Thus $$F(\mu,\kappa) = F_1(\sigma,p)$$

Furthermore the normalized applied field $\sigma'$ can be introduced into the device function by rewriting (2) as $$\sigma = \sigma' - F_d p$$

The new device function $F_2(\sigma',p)$ thus contains the demagnetizing factor $F_d$ as a parameter and only one parameter, $p$, which is temperature dependent. Hence the condition for temperature compensation is that the partial derivative of the device function with respect to the normalized saturation magnetization $p$, with external field and frequency constant, be equal to zero;

$$\left.\frac{\partial F_2(\sigma',p)}{\partial p}\right|_{\sigma'=\text{constant}} = 0 \quad (3)$$

The temperature range over which compensation is effective will depend on the nature of the device function $F_2$.

If $F_2$ is linear in $p$, temperature compensation will be effective over a wide range of temperatures, otherwise the compensated temperature range will depend on the sensitivity of condition (3) to small changes in $p$. In any event, the performance of the resultant structures will be considerably less sensitive to temperature changes than heretofore.

As stated hereinabove, the demagnetizing factor for a given geometry depends primarily upon the transverse cross sectional dimensions of the element and upon the air gap between the magnet pole pieces and the gyromagnetic element. The demagnetizing factor of a given geometry can generally be expressed mathematically and, from the condition for temperature compensation obtained in (3) above, the air gap and cross sectional dimensions may be selected to present the demagnetizing factor necessary to satisfy (3). Such a structure, as will be more fully set out hereinafter, may have a temperature coefficient as low as one-fourteenth that of the prior art structures which would normally be used in the absence of the application of the temperature compensation principle disclosed herein.

A particular advantage to be gained from utilization of this principle arises from the fact that only means for providing an external magnetic biasing field of constant strength for the gyromagnetic material are needed. Thus, the invention has particular application to gyromagnetic devices installed in unattended remote installations such as, for example, repeater stations in long distance communication systems.

A fuller understanding of the present invention may be gained from reference to the drawing and to the detailed description thereof which follows. In the drawing:

FIG. 1 is a transverse cross sectional view of an elliptical cylinder of gyromagnetic material in a uniform magnetic field;

FIGS. 2A and 2B illustrate a magnetic circuit and air gap without and with a gyromagnetic element, respectively;

FIG. 5 is a typical temperature-compensated gyromagnetic resonance device constructed in accordance with the principles of the present invention; and FIGS. 6 and 7 are additional temperature-compensated gyromagnetic structures which may result from an application of the principles of the invention.

Figure 3:
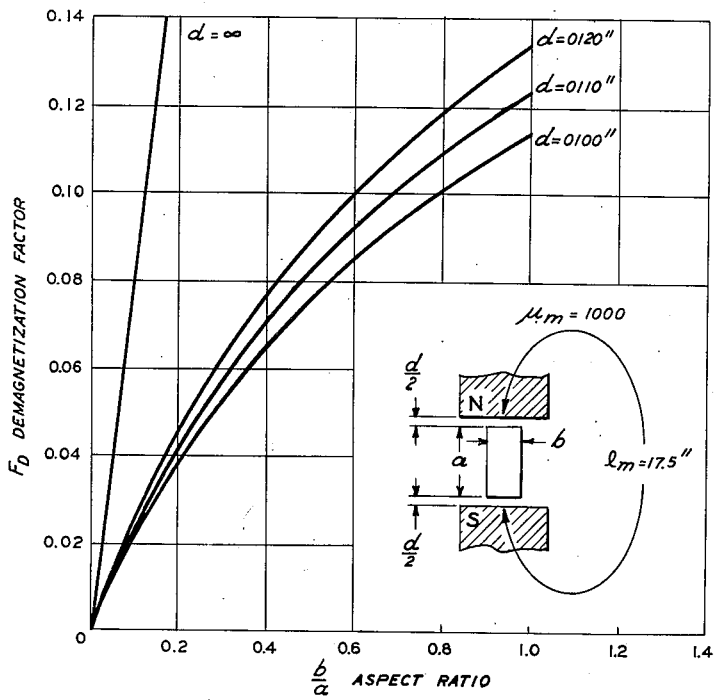
FIG. 3 is a graphical representation of the demagnetization factor of a magnet-gyromagnetic element structure versus the aspect ratio $b/a$ of the element.

Referring more particularly to the drawing, FIGS. 1 through 4, given by way of explanation, are illustrative of the general method of temperature compensation disclosed herein as applied to a transversely magnetized rectangular slab of gyromagnetic material disposed within a rectangular guide and biased to gyromagnetic resonance. Such a device, illustrated in FIG. 5, comprises a section of hollow pipe wave guide 50 including within its rectangular transverse cross section gyromagnetic element 51. Guide 50 comprises pairs of oppositely disposed parallel conductive walls, the wider transverse dimension of which is greater than one-half wavelength but less than one wavelength of the lowest frequency wave energy to be transmitted. Generally, the wide dimension is equal to three-quarters of this cut-off wavelength and the narrow dimension is equal to one-half of the wide dimension.

Extending longitudinally within guide 50 for at least one wavelength of the energy to be propagated is element 51 of magnetically polarizable material which exhibits gyromagnetic properties at microwave frequencies. Such materials will be referred to in this specification as gyromagnetic materials, the more completely descriptive phrase given above being implied in all cases. The term gyromagnetic material is employed here in its accepted sense as designating the class of materials having portions of the atoms thereof that are capable of exhibiting a significant precessional motion at frequencies within the microwave frequency range, this precessional motion having an angular momentum, a gyroscopic moment, and a magnetic moment. Included in this class of materials are ionized gaseous media, paramagnetic materials, and ferromagnetic materials including the spinel ferrites and the garnet-like yttrium-iron compounds. One particular class of gyromagnetic materials suitable for use as element 51 in the present invention comprises iron oxide combined with a quantity of bivalent metal such as nickel, magnesium, zinc, manganese, or other similar material. As a specific example element 11 may comprise magnesium-aluminum-manganese ferrite prepared in the manner described in United States Patent 2,748,353 which issued to C. L. Hogan on May 29, 1956. Element 51 has transverse cross sectional dimensions $a$, $b$, the relative magnitudes of which will be fully set out in a later portion of this specification. Electromagnet 52 partially surrounds guide 50 and is oriented to magnetize element 51 in a transverse direction parallel to the narrow walls of guide 50. When guide 50 is excited in the $TE_{10}$ wave mode, the direction of the magnetic bias is parallel to the electric field lines of the mode pattern. Electromagnet 52 is energized by current I from voltage source 54 flowing through winding 55. Variable resistance 56 is connected in series with source 54 and provides a means for controlling the intensity of the biasing field. Pole pieces 57, 58 of electromagnet 52 are separated a total distance $(d+a)$. This separation is an important parameter of the geometry and enters into the scheme of temperature compensation to be more fully set out hereinafter. As illustrated in FIG. 5, gyromagnetic element 51 is centrally located within guide 50 and therefore the device functions as a reciprocal attenuator or phase shifter. If element 51 be displaced closer to one narrow sidewall, the transmission properties of the device will become nonreciprocal in the now well-known manner.

In order to determine the geometry of the structure of FIG. 5 which will produce temperature compensation, it will be necessary first to express the demagnetizing factor $F_d$ in terms of the geometry. As a first approximation of $F_d$ for the geometry of FIG. 5, the demagnetization factor of the geometry of FIG. 1 may be used. In FIG. 1, an elliptical cylinder 10 of gyromagnetic material having a cross section with major and minor axes of dimension $a'$ and $b'$, respectively, is immersed in a uniform external field of strength $H_a$ which extends in a direction such that within the material the magnetic flux $H_i$ is parallel to the major axis. At page 213 of J. A. Stratton's book entitled "Electromagnetic Theory" (McGraw-Hill, 1940), the demagnetization factor of such a geometry is given as $$F_d' = \frac{\frac{b'}{a'}}{1+\frac{b'}{a'}} \qquad (4)$$

It is found, however, that Equation (4) is not accurate for gyromagnetic slabs between the pole pieces of a relatively narrow gap magnet due to image fields from reflections at the pole pieces. Through reference to the geometries of FIGS. 2A and 2B, a more accurate expression for the demagnetizing factor of the geometry of FIG. 5 may be obtained.

FIG. 2A is a semi-schematic view of an electromagnet 20 with a gap $g$ between its pole pieces. The permeability of the magnet core 21 is $\mu_m$ and its length is $l_m$. The magnet core is excited by the passage of current I through windings 22 of $n$ turns. The magnetic field intensity within the core 21 is designated $H_{m1}$; that within the air gap as $H_{a1}$. These magnetic fields may be related as $$H_{a1} = \mu_m H_{m1}$$

Applying Ampere's law for the magnetic field intensities, $$nI = H_{a1}g + H_{m1}l_m \qquad (5)$$

In FIG. 2B, electromagnet 20, comprising magnet core 21 with constants $\mu_m$ and $l_m$ as in FIG. 2A, is again excited by the passage of current I through winding 22 of $n$ turns. In addition, gyromagnetic block 23 having dimensions $a$, $b$ partially fills the air gap, thus leaving two air spaces $d/2$ between block 23 and magnet core 21. The magnetic field in the magnet core is designated $H_{m2}$; that in the air spaces as $H_{a2}$; and that in the gyromagnetic block as $H_i$. It may be assumed that the gyromagnetic material is saturated and all magnetic flux is contained in the magnetic circuit comprising core 21, air spaces $d/2$, and gyromagnetic block 23. Accordingly, $$H_{a2} = \mu_m H_{m2} = H_i + M_s$$

again applying Ampere's law $$nI = H_{a2}d + H_{m2}l_m + H_{ia} \qquad (6)$$

Eliminating $H_{m1}$, $H_{a2}$, and $H_{m2}$ from Equations (5) and (6) and combining them, recalling that $g = a + d$ and that the current I must be held constant, we obtain $$H_{a1} = H_i + \frac{d + \frac{l_m}{\mu_m}}{a + d + \frac{l_m}{\mu_m}} M_s = H_i + F_d'' M_s$$

Thus the demagnetization factor of the geometry of FIG. 2B is seen to be $$F_d'' = \frac{\frac{d'}{a}}{1 + \frac{d'}{a}} \qquad (7)$$

where $$d' = d + \frac{l_m}{\mu_m}$$

Here $d'$ is an adjusted value for the air gap $d$ to take into account the finite permeability of the magnet core. It may be seen that $F_d''$ alone does not depend upon the thickness $b$ of the gyromagnetic slab. This dimension does affect the electrical behavior of the slab and, in order that the expression for the demagnetization factor for the geometry of FIG. 5 be more accurate, the demagnetization factor may be approximated by the product of $F_d''$ and $F_d'$. Thus the internal field of a transversely magnetized gyromagnetic element in a rectangular wave guide is seen to be $$H_i = H_a - F_d' F_d'' M_s \qquad (8)$$

FIG. 3 shows graphical representations of the demagnetization factor versus aspect ratio $b/a$ of a gyromagnetic slab in a magnet air gap as illustrated in the inset for various gap dimensions. A magnet core length of 17.5 inches and a magnet core permeability of 1000 have been assumed. As may be seen from the graph, the demagnetization factor goes to zero for a very thin slab regardless of air gap dimensions and for vanishing air gap regardless of slab thickness $b$. It remains small as long as the air gap is small and approaches unity only for a large air gap and a slab of vanishing height $a$.

Having expressed the demagnetization factor in terms of the slab dimension and air gap, there remains only to describe the function of the device and to determine from the device function the demagnetizing factor which will result in a temperature compensated device. In an article entitled "On the Theory of Ferromagnetic Resonance Absorption" by C. Kittel, which appeared at page 155 of vol. 73 of the Physical Review, the resonance condition for the transversely magnetized elliptical cylinder of gyromagnetic material shown in FIG. 1, of which the long rectangular slab of FIG. 5 is a good approximation, may be expressed as $$\frac{\omega_0}{\gamma} = \left\{ \left[ H_i + (1 - F_d') M_s \right] H_i \right\}^{1/2} \qquad (9)$$

where $\omega_0$ = the resonant frequency. Solving (9) for the internal field required for resonance at the operating frequency $$H_{io} = \sqrt{\left(\frac{\omega}{\gamma}\right)^2 + \frac{(1 - F_d')^2 M_s^2}{4}} - \frac{(1 - F_d') M_s}{2} \qquad (10)$$

It may be seen from (10) that a change in temperature with its attendant change in $M_s$ will produce a change in the internal field required for resonance at a given frequency. The required change in the externally applied field $H_a$ for resonance may be found by combining Equations (8) and (10) and differentiating with respect to the saturation magnetization $M_s$. This operation results in $$\Delta H_{ao} = K_k \Delta M_s \qquad (11)$$

where the temperature coefficient $K_k$ is given by $$K_k = \frac{(1 - F_d')}{2} \left[ \frac{p}{\sqrt{\frac{4}{(1 - F_d')^2} + p^2}} - 1 \right] + F_d' F_d'' \qquad (12)$$

This temperature coefficient may be positive, negative or zero depending upon the orientation and cross section of the gyromagnetic slab and on the air gap in the biasing magnet. It is readily apparent from Equation (11) that if $K_k = 0$, the variations of $M_s$ with temperature will have no effect upon the strength of the applied magnetic field required for resonance. A geometry with such a property, allowing a constant biasing field strength over a considerable temperature range, meets the object of the present invention. From Equation (12) it is found that $K_k = 0$ if $$F_d'' = \frac{1}{2\frac{b}{a}} \left[ 1 - \frac{p}{\sqrt{4\left(1 + \frac{b}{a}\right)^2 + p^2}} \right] \qquad (13)$$

Figure 4:
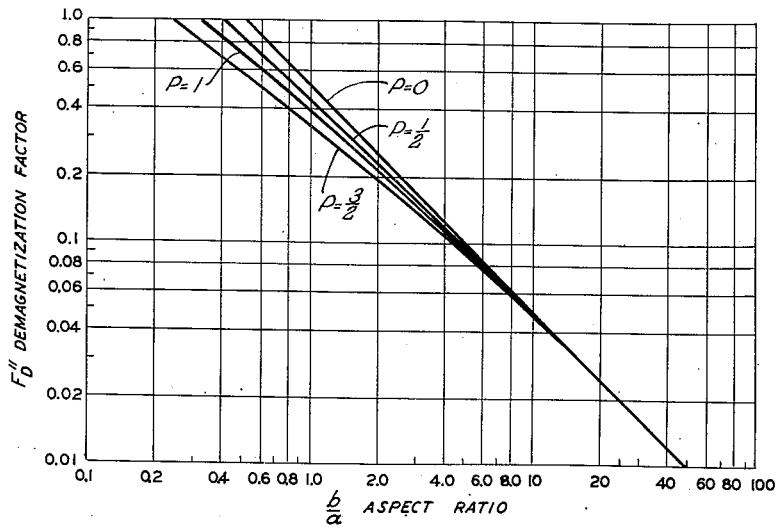
FIG. 4 is a graphical representation of the demagnetization factor versus the aspect ratio for the condition of temperature compensation of a gyromagnetic resonance device.

The demagnetization factor $F_d''$ required to satisfy (13) is plotted versus the aspect ratio $b/a$ for several values of the normalized saturation magnetization $p$ on FIG. 4. It may be noted from FIG. 4 that temperature compensation of geometries with a small aspect ratio requires not only a high demagnetizing factor $F_d''$ but also a high normalized saturation magnetization $p$. At least in principle temperature compensation is possible for geometries with a small aspect ratio by using a high saturation material and a very large air gap. However, the resulting geometry is of minimum practical value because of the unattractive design of the magnetic circuit and the electrical properties of gyromagnetic materials with high saturation magnetization. Consequently, and in accordance with the present invention it is advisable to use a geometry with an aspect ratio $$\frac{b}{a} > \frac{1}{2}$$

A first order approximation of (13) may be obtained by setting $p = 0$, for which one obtains $$\frac{d'}{a} = \frac{1}{2\frac{b}{a} - 1}$$

or $$d' = \frac{a^2}{2b - a} \qquad (14)$$

For practical geometries of interest, $d' = d$ since the ratio $$\frac{l_m}{\mu_m}$$

would be very small. Thus the condition for temperature compensation for a transversely magnetized gyromagnetic resonance device; i.e., the geometry which causes the demagnetizing factors involved to operate to minimize temperature variation effects, may be simply expressed as $$d = \frac{a^2}{2b-a} \qquad (15)$$

where
$d$ is the total air gap between magnet poles and gyromagnetic element,
$a$ is the height of gyromagnetic element,
$b$ is the width of gyromagnetic element.

Returning now to FIG. 5, the full significance of the dimensional parameters of the geometry which are involved in the temperature compensation scheme becomes more clear. Thus, the air gaps above and below the gyromagnetic element 51 have magnitudes $d/2$, the height of the element is labeled $a$ and its width $b$. As stated above, practical considerations require that the width of the element be greater than one-half its height. The general shape of the element is, therefore, restricted to geometries other than the heretofore widely used thin transverse slab or vane which had a narrow transverse dimension $b$ much less than its wide transverse dimension $a$. As illustrated in FIG. 5, the cross section of element 51 is square. In addition, subject to limitations imposed by the magnet air-gap dimensions, element 51 may advantageously take the form of a flat plate of which the wider transverse dimension is parallel to the wide walls of guide 50.

One temperature compensated gyromagnetic resonance device for use at 9375 megacycles which has been constructed and tested employed a Bell Telephone Laboratories ferrite type XMC–1200 as the gyromagnetic element with dimension $b$ of .152 inch and a dimension $a$ of .200 inch. This ferrite sample had a saturation magnetization of 1200 oersteds. Total distance between magnet pole pieces was .500 inch, thus making $d = .300$ inch. Assuming that gyromagnetic resonance took place at that value of the applied field where the transmission loss of the loaded guide was a maximum, it was found that over a temperature range from −8° centigrade to +68° centigrade the temperature coefficient was only −0.40 oersted per degree. This means that in order to maintain the device at exact resonance over the 70-degree temperature swing a variation in applied field of only 28 oersteds would be required. The magnitude of applied field required for resonance was of the order of 3600 oersteds so the total variation represents a change of only 0.77 percent of the field required for resonance. Such performance is far superior to the performance expected in the absence of temperature compensation in which the temperature coefficient may be of the order of 3.6 oersteds per degree centigrade. In such prior art devices a temperature swing of 70 degrees would have required a magnetic field strength variation of 252 oersteds, or 7 percent of the field required for resonance. Thus, the performance of gyromagnetic devices constructed in accordance with the present invention is at least an order of magnitude superior to that of prior art devices.

FIGS. 6 and 7 represent geometries which may be required for temperature compensation in accordance with the principles set out above. Thus, due to restrictions on the size and shape of the gyromagnetic element 60 in FIG. 6, it may be necessary to reduce the height of guide 61 to obtain the proper air gap and to produce temperature compensation according to Equation (15). This may be accomplished without disturbing the propagation by utilizing quarter wave impedance transforming sections 62, for example, or by long tapers well known in the art. Alternatively pole pieces 63, 64 associated with magnet 65 may extend into the wave guide interior and the quarter wave sections be eliminated, but such a geometry tends to cause undesirable reflection of wave energy.

On the other hand, as illustrated in FIG. 7 the element dimensions may be such as to require the magnet pole pieces 70, 71 to be spaced apart a distance greater than the height of the wave guide 72. In such a case magnet 73, which is energizsed by current from source 74 flowing through turns of wire 75 and variable resistor 76, may be selected to be physically spaced away from the walls of the guide. The total distance between gyromagnetic element 77, again having dimensions $a$, $b$, and pole pieces 70, 71 is determined in accordance with the principles of temperature compensation set out hereinabove.

In all cases it is understood that the above-described arrangements are merely illustrative of the many specific embodiments which can represent application of the principles of the present invention. Numerous and varied other arrangements can readily be devised in accordance with these principles by those skilled in the art without departing from the spirit and scope of the invention.

What is claimed is:

1. A wave guide component adapted to support electromagnetic waves comprising a conductively bounded wave guide of rectangular transverse cross section having opposed pairs of broad and narrow walls, an element of gyromagnetic material of rectangular transverse cross section longitudinally disposed within said guide equidistant from each wall of said pair of broad walls with a first surface of said element parallel to said pair of broad walls and a second surface thereof parallel to said pair of narrow walls, means including spaced magnet pole pieces for applying to said element in a direction parallel to said narrow walls and transverse to the direction of propagation of said waves in said element a magnetic biasing field having a strength sufficient to cause said element to become gyroresonant at the frequency of said waves, the transverse dimension $b$ of said first surface being equal to at least one-half the transverse dimension $a$ of said second surface, the pole pieces of said magnetic biasing means being spaced apart a total distance of $$a\left(1 + \frac{a}{2b-a}\right)$$

and the ferrite being symmetrically positioned within the gap between the pole pieces.

2. In combination, a section of conductively bounded hollow pipe type wave guide adapted to support high frequency electromagnetic waves, an element of gyromagnetic material having dimensions $a$, $b$, in orthogonal directions transverse to the direction of propagation of said waves, means including pole pieces spaced from said element a total distance $d$ for subjecting said element to a magnetic biasing field extending in a direction parallel to one of said orthogonal transverse dimensions, said transverse dimension which is orthogonal to the direction of said field being equal to at least one-half of the transverse dimension parallel to said field, said dimensions $a$, $b$, and $d$ being proportioned according to the relationship $$d = \frac{a^2}{2b-a}$$

said gyromagnetic element being symmetrically positioned both within the air gap between the pole pieces and within the wave guide with respect to a plane equidistant from said pole pieces and extending in a direction normal to the magnetic field between said pole pieces.

3. In combination, a section of conductively bounded wave guide of rectangular transverse cross section adapted to support dominant mode electromagnetic waves at the operating frequency, means including magnet pole pieces for applying a magnetic biasing field to said guide section in a direction transverse to the direction of propagation of said waves through said section, an element of gyromagnetic material extending longitudinally within said section, said element having a transverse cross sectional dimension $b$ in a direction orthogonal to the direction of said biasing field which is at least one-half its transverse cross sectional dimension $a$ in a direction parallel to said field direction and the pole pieces being separated a total distance $$a\left(1+\frac{a}{2b-a}\right)$$

4. The combination according to claim 3 in which said poles pieces are spaced away from the exterior of said guide section.

5. The combination according to claim 3 in which said pole pieces contact the exterior of said guide section.

6. The combination according to claim 5 in which the dimension of the portion of said guide section in the vicinity of said element parallel to the dimension $a$ of said element is less than the corresponding dimension of the portion of said section preceding and following said element, including wave guide impedance transforming means between said differently proportioned guide portions.

References Cited in the file of this patent

UNITED STATES PATENTS

| | | |
|---|---|---|
| 2,755,447 | Engelmann | July 17, 1956 |
| 2,956,245 | Duncan | Oct. 11, 1960 |

FOREIGN PATENTS

| | | |
|---|---|---|
| 1,038,622 | Germany | Sept. 11, 1958 |
| 1,038,623 | Germany | Sept. 11, 1958 |
| 1,183,418 | France | Jan. 26, 1959 |

OTHER REFERENCES

Morgenthaler et al.: "Proceedings of the IRE," November 1957, pages 1551–1552.

Lax: "Proceedings of the IRE," October 1956, pages 1368–1386.

"Post Office Electrical Engineers Journal," April 1959, pages 71–73.